Dec. 21, 1926.　　　　　　　　　　　　　　　　　　1,611,599
G. R. LIVERGOOD
SLIP FOR PIPE
Filed March 27, 1926　　　3 Sheets-Sheet 1

Inventor
Gerald R. Livergood
By Jesse R. Stone
Attorney

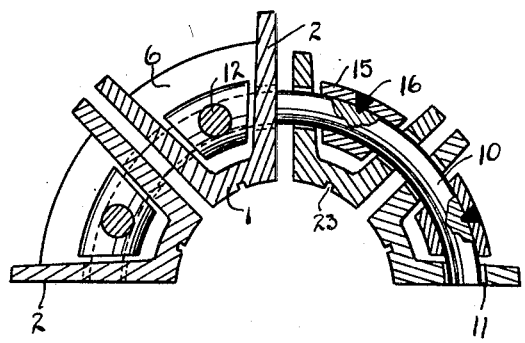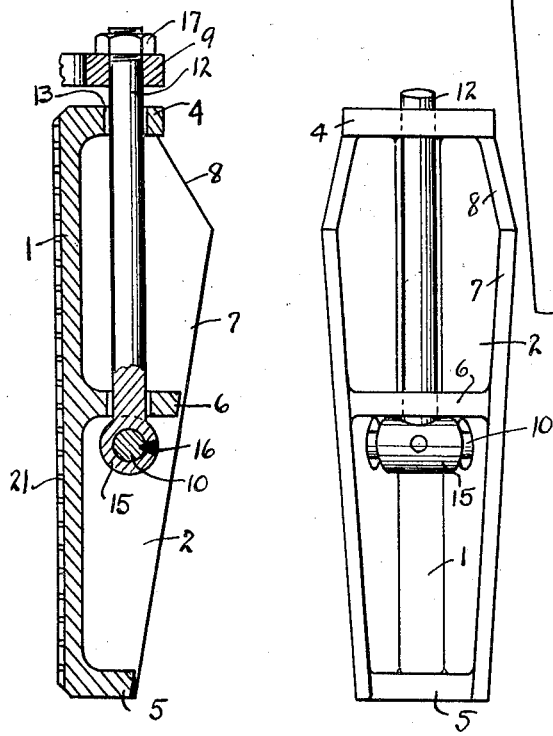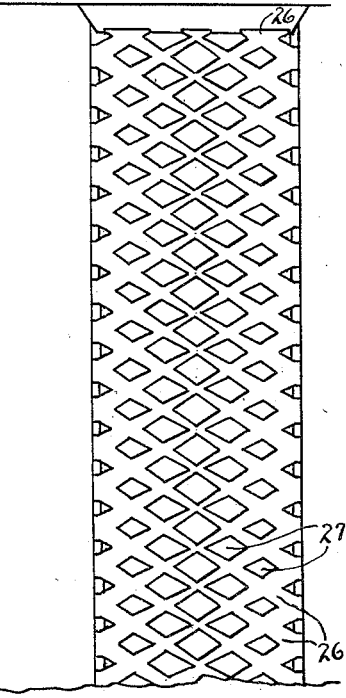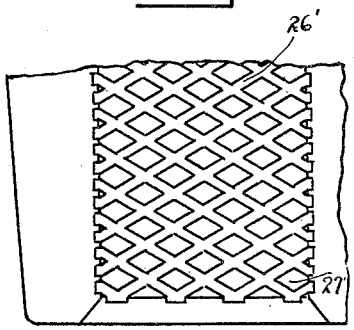

Dec. 21, 1926.

G. R. LIVERGOOD 1,611,599

SLIP FOR PIPE

Filed March 27, 1926   3 Sheets-Sheet 3

Gerald R. Livergood  Inventor

By Jesse R. Stone

Attorney

Patented Dec. 21, 1926.

1,611,599

UNITED STATES PATENT OFFICE.

GERALD R. LIVERGOOD, OF HOUSTON, TEXAS.

SLIP FOR PIPE.

Application filed March 27, 1926. Serial No. 97,880.

My invention relates to slips employed in holding pipe in deep well operations.

In handling pipe while it is being inserted into a well or removed therefrom, the pipe must be lowered or raised and additions made or taken from the pipe string in multiples of pipe section, and the coupling at the joints are made up or broken out as the case may be. In so doing, the pipe is supported in a spider, or bushing, at the upper end of the hole, mounted either upon the rotary table or the casing head. In drilling operations the bushing is mounted in an opening in the table of the rotary. A downwardly tapered seat is provided in the bushing and the slips are formed to engage the bowl thereof on their outer faces and to engage the pipe on their inner faces.

In the proper functioning of pipe engaging slips, the inner face should adhere to the pipe and the outer face should slide downwardly in the tapered seat so as to be wedged against and grip the pipe firmly. As the outer surface of each slip is ordinarily of greater area than the inner pipe gripping face, the friction is apt to be stronger on the outer face of the slip, thus allowing slipping on the inner face at the pipe before the pipe is firmly seized by the wedging action of the tapered seat upon the slips, and mutilation of the pipe may then occur.

It is an object of my invention to provide a pipe engaging slip which will have a greater frictional area on its pipe engaging surface than it has upon its outer face where it engages the tapered seat, and thus overcome any tendency of the pipe to slip in the gripping device.

It is also an object to provide a slip of the multiple jaw type which will be light in weight and thus easily handled; and which, because of its structure, is adapted to be made for use with either large or small sizes of pipe.

It is further desired to so form the gripping face of the slip that the mud and oil usually present on the pipe will be received in drainage channels in the slip face, and thus be allowed to flow away so as not to interfere with the gripping action of the jaws.

Figure 2:
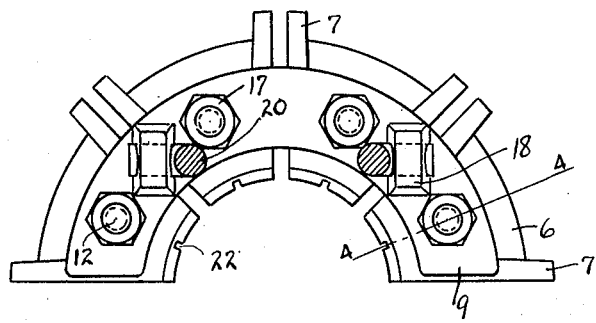
Figure 1:
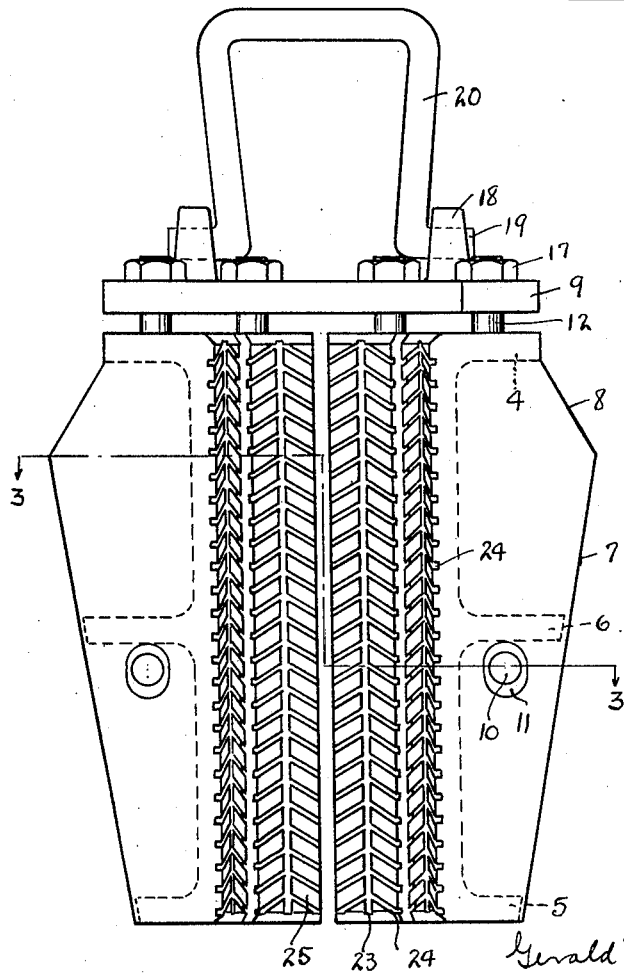
Figure 11:
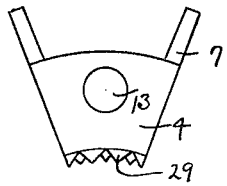
Figure 12:
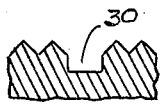
Figure 13:
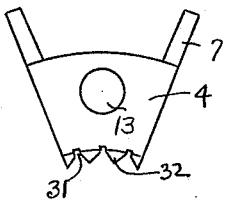
Figure 8:
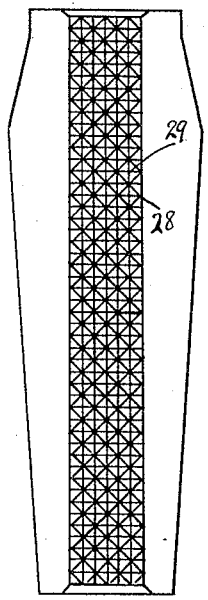
Figure 9:
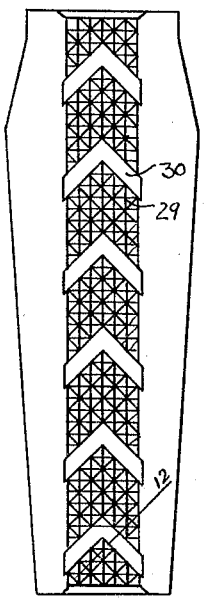
Figure 10:
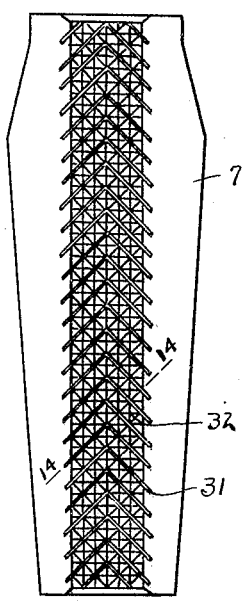
Figure 14:

Referring to the drawings herewith, wherein several embodiments of my invention are set out, Fig. 1 is a front elevation of a multiple jaw slip employing my invention. Fig. 2 is a top plan view thereof, the handle being shown in section. Fig. 3 is a horizontal section on the plane 3—3 of Fig. 1. Fig. 4 is a vertical section on the plane 4—4 of Fig. 2. Fig. 5 is a rear elevation of one of the jaws of the slip. Fig. 6 is a broken front elevation of the jaw illustrating the manner in which the pipe engaging face may be formed. Fig. 7 is a modification of the Fig. 6 type of toothed face. Figs. 8, 9 and 10 are similar front elevations of jaws for slips, each illustrating a separate type of pipe engaging face. Fig. 11 is a top plan view of the jaw shown in Fig. 8. Fig. 12 is a transverse section on the line 12—12 of Fig. 9. Fig. 13 is a top plan view of the jaw shown in Fig. 10, and Fig. 14 is a broken section on the plane 14—14 of Fig. 10. Like numerals of reference are employed to designate like parts in all the views.

In the construction of multiple jaw slips, it is usual to divide two slips for engaging the pipe, the two slips together entirely surrounding the pipe, each of the slips including one-half the circumference of the said pipe. Each slip is, however, made up of a plurality of jaws and in the present embodiment I have shown four jaws for each slip. The general construction of the jaws and the manner in which they are held together as one slip constitutes an important feature of my invention.

Each of the jaws making up the slip includes a forward plate 1 which is curved transversely to fit the pipe which it is to engage. The plates 1 are comparatively thin, although it must be understood that they will in all cases be made strong enough to withstand the heavy strain to which they are subjected. Each plate has a rearwardly extending rib 2 at each edge thereof, the plate and the ribs thus forming a jaw approximately U-shaped in cross section. The ribs 2 are connected at their upper and lower ends by webs 4 and 5 respectively. There is also an intermediate transverse web 6 between the ribs. The outer or rearward face of each slip has the ribs above the webs 5 and 6 tapered downwardly at 7 to fit the usual tapered seat or bushing in which slips of this character are invariably used. It is an object of the invention to provide as small a frictional area along the edges 7 of the ribs to contact with the tapered seat as is practicable. The tapered portion 7, therefore, extends only approximately three-fourths the length of the jaw and is then inclined away from the tapered seat at 8 joining the outer side of the upper web 4.

Each jaw is similarly formed and adjacent jaws are secured together in such manner that they may have a small movement relative to each other so as to adjust each jaw to the pipe. The holding means comprises an upper plate 9 which is practically semi-circular in shape, as shown best in Fig. 2. It overlies the upper ends of the four jaws comprising the slip. There is also a curved rod 10 extending through openings 11 in the ribs of each of the jaws, said openings being larger than the diameter of the curved rod. The upper plate 9 and the said rod are joined together to form a holding frame by means of upright rods 12. Said rods 12 extend through openings 13 and 14 in the upper and lower webs 4 and 6 respectively, having a loose fit in said openings to allow movement of the jaws. The lower end of each of the rods 12 is enlarged to form a head 15 having an opening therein to receive the curved rod 10. It is contemplated that the rods 12 will be inserted upwardly through the webs 4 and 6 of the jaw and that the curved rod 10 will then be inserted through the openings in the heads 15 of the rods and that the heads 15 will then be welded or otherwise secured rigidly to the transverse rod 10. In the drawing, I have indicated a weld 16 as being employed to form the connection. The upper ends of the rods 12 are extended through openings in the plate 9 adapted to register therewith and are detachably secured in place by means of nuts 17. The upper plate 9 has an upwardly extending pair of bosses 18 thereon which have openings to receive the lower ends 19 of the handle 20.

A difficulty commonly experienced with pipe engaging slips is that the pipe while it is coming out of the well is ordinarily covered with oil and mud. This makes it difficult under some circumstances for the slip to properly engage the pipe so that there will be no slipping of the pipe therein. To overcome this difficulty, I have formed the pipe engaging face 21 of the jaw with draining channels 22 therein. In the embodiment shown in Fig. 1, these drainage channels comprise one central longitudinal groove or a channel 23 and inclined channels 24 connecting with the central groove and extending to the sides of the pipe engaging face. Between the channels are thus left a series of inclined pipe engaging areas 25, which because of their opposite inclinations relative to the pipe, will tend to resist rotation of the pipe. It will be seen that when the slip is forced against the pipe the mud or oil thereon will tend to be forced into the drainage channels 23 and 24 and that the gripping areas 25 will obtain a firm hold on the pipe surface.

I have shown a number of embodiments of my idea of cutting the drainage channels. In Fig. 6 the channels indicated at 26 are inclined entirely across the face of the jaw from which side, the channels crossing each other, leaving polygonal areas 27 between the channels. The channels are also widened gradually from the central line of the jaw so as to provide better drainage of the mud and oil.

In the Fig. 7 embodiment, the drainage channels are cut in the same manner as in the Fig. 6 embodiment, except that the channels 26' are of the same width entirely across the jaw.

In Figs. 8 and 11, the channels 28 are cut diagonally across the face of the jaw from each side, thus forming pyramidal shaped teeth 29 between the channels. This type of face is advantageous in some conditions but the area engaging the pipe is lessened through the comparatively sharp points formed upon the engaging surfaces.

In Figs. 9 and 12, the face is similar to that shown in Fig. 8, except that comparatively wide drainage channels 30 are formed at spaced intervals along the jaw, said channels being inclined downwardly from the central axis of the jaw. This embodiment allows efficient drainage of the mud and oil away from the jaw, but the pipe engaging the area has points thereon, as in the Fig. 8 embodiment.

In Figs. 10, 13 and 14 the drainage channels 31 are comparatively narrow but are deepened from the central line of the jaw outwardly. This is illustrated in Fig. 14. The channels are cut in a direction inclined from the center of the jaw and the spaces between the drainage channels are formed with pyramidal shaped teeth 32.

My slip constructed as described will be seen to have an efficient pipe engaging face on each slip, the area of which is comparatively large relative to the area of the ribs 7 where the jaws engage the tapered seat of the bushing. When the slip is placed about the pipe within the tapered bushing, the tendency will therefore be for the jaw to slide downwardly within the bushing, the forward face of the jaw adhering frictionally to the pipe so that there will be no slipping between the jaw and pipe tending to mutilate or break the pipe. This will give a most efficient gripping action.

This action is also made effective through the provision of the drainage channels for the mud and oil upon the pipe. All foreign matter adhering to the pipe will be squeezed into the drainage channels through the pressure of the slip and allow a close contact between the jaws and the pipe.

The particular construction of the holding means for the jaws upon the slip allows the slip to be light in weight so that it may be easily handled, and the fact that the holding rods 12 extend only slightly below the web 6 will allow the construction of jaws on this plane which will fit upon large sizes of pipe where a comparatively thin jaw is necessary. Further advantages of the construction will be apparent to those skilled in the art.

What I claim as new and desire to protect by Letters Patent is:

1. A multiple jaw slip comprising a plurality of arcuate pipe engaging plates, radially extending ribs on each of said plates, the outer edges of said ribs being tapered to engage a downwardly tapered seat, transverse webs between said ribs at their upper ends and approximately midway thereof, an upper semi-circular plate, and rods extending through said plate and the webs of said jaws.

2. A multiple jaw slip comprising a plurality of arcuate pipe engaging plates, radially extending ribs on each of said plates, the outer edges of said ribs being tapered to engage a downwardly tapered seat, transverse webs between said ribs at their upper ends and approximately midway thereof, an upper semi-circular plate, and rods extending through said plate and the webs of said jaws, and means connecting the lower ends of said rods, each jaw being loosely supported on said rods.

3. In a multiple jaw slip, a plurality of jaws made up of plates transversely curved to engage a pipe, radial ribs on said plates the outer edges of which are tapered downwardly, a transverse web between said ribs approximately midway thereof, an upper arcuate holding plate for said jaws, a curved rod extending transversely through the ribs of adjacent jaws below said webs, and upright rods connecting said holding plate and said curved rod, said rods fitting loosely in said jaws.

4. In a multiple jaw slip, a plurality of jaws made up of plates transversely curved to engage a pipe, radial ribs on said plates the outer edges of which are tapered downwardly, a transverse web between said ribs approximately midway thereof, an upper arcuate holding plate for said jaws, a curved rod extending transversely through the ribs of adjacent jaws below said webs, and upright rods connecting said holding plate and said curved rod, said rods fitting loosely in said jaws.

5. In a multiple jaw slip, a plurality of jaws made up of arcuate plates, each plate having ribs extending radially outward therefrom, the outer edges of said ribs being tapered downwardly, webs between said ribs at the upper and intermediate portions of said jaws, rods mounted loosely in said webs, and arcuate members connecting the upper and lower ends of said rods.

6. In a multiple jaw slip, a plurality of jaws made up of arcuate plates, each plate having ribs extending radially outward therefrom, the outer edges of said ribs being tapered downwardly, webs between said ribs at the upper and intermediate portions of said jaws, rods mounted loosely in said webs, and arcuate members connecting the upper and lower ends of said rods, the lower of said arcuate members being supported loosely in said ribs.

7. In a pipe engaging slip, a jaw comprising an arcuate plate having downwardly inclined channels in its inner face, radially extending ribs on its outer face, and reinforcing webs between said ribs.

8. A pipe engaging slip including a jaw adapted to fit a tapered seat having an arcuate pipe engaging face, there being a series of downwardly inclined drainage channels therein, and means to handle said slip.

9. In a pipe engaging slip, a jaw having an inner arcuate face cut with channels downwardly inclined from the central line thereof forming flat areas intermediate the said channels to engage frictionally with the pipe in the manner described.

10. In a pipe engaging slip, a jaw having an inner arcuate face cut with channels downwardly inclined from the central line thereof forming flat areas intermediate the said channels to engage frictionally with the pipe in the manner described, and rearwardly extending ribs on said jaw to engage a tapered seat.

In testimony whereof I hereunto affix my signature this 23rd day of March, A. D. 1926.

GERALD R. LIVERGOOD.